United States Patent

[11] 3,587,765

| [72] | Inventors | James W. McFarland<br>Hutchinson, Kans.;<br>Wendell E. Miller, Warsaw, Ind. |
|---|---|---|
| [21] | Appl. No. | 777,638 |
| [22] | Filed | Nov. 21, 1968 |
| [45] | Patented | June 28, 1971 |
| [73] | Assignee | Cessna Aircraft Company<br>Wichita, Kans. |

[54] ACCELERATION CONTROL FOR HYDRAULIC TRANSMISSIONS
9 Claims, 6 Drawing Figs.

[52] U.S. Cl. .................................................. 180/66,
60/19, 60/53, 137/44, 137/45
[51] Int. Cl. .................................................. B60k 17/10
[50] Field of Search ........................................ 180/66, 1,
77, 105, 108, 103, 107; 105/96.2; 60/5(a), 19;
137/38, 39, 44, 45, 46

[56] References Cited
UNITED STATES PATENTS

| 1,955,198 | 4/1934 | Mellichampe ............... | 137/44 |
| 1,990,354 | 2/1935 | Sylvester, Jr. et al. ........ | 180/54 |
| 2,257,724 | 10/1941 | Bennetch ...................... | 60/53X(A) |
| 2,326,821 | 8/1943 | Boyle ............................ | 60/19 |
| 2,516,662 | 7/1950 | Vickers et al. ................ | 180/66 |
| 3,058,297 | 10/1962 | Tolley .......................... | 60/19 |
| 3,238,724 | 3/1966 | Miller ........................... | 60/53(A) |
| 3,302,389 | 2/1967 | Cadiou ......................... | 60/53X(A) |
| 3,395,586 | 8/1968 | Kirchner ...................... | 74/230.17 |

FOREIGN PATENTS

| 670,086 | 4/1952 | Great Britain ............... | 60/19 |

Primary Examiner—Leo Friaglia
Assistant Examiner—Milton L. Smith
Attorneys—Gregory J. Nelson and Hubert E. Miller ABSTRACT: A control device for use with a vehicular hydrostatic drive which limits the rate of change of speed of hydrostatic transmission. A fluid pressure actuated mechanism is operatively connected to the transmission to change the speed of the transmission, and the rate of operation of the mechanism is dependent upon the rate of fluid flow thereto. An acceleration sensor measures the rate of acceleration or deceleration of the vehicle and operates a variable flow restrictor placed in a flow line which conducts fluid from a pressure source to the fluid pressure actuated mechanism.

INVENTORS
JAMES W. McFARLAND
WENDELL E. MILLER
BY
*Gregory J. Nelson*
ATTORNEY

INVENTORS
JAMES W. McFARLAND
WENDELL E. MILLER
BY
Gregory J. Nelson
ATTORNEY

INVENTORS
JAMES W. M FARLAND
WENDELL E. MILLER

ACCELERATION CONTROL FOR HYDRAULIC TRANSMISSIONS

The present invention pertains to an acceleration rate control for hydraulic variable-speed transmissions. More particularly, this invention relates to a control which limits the rate of change of speed of a variable-speed drive of the hydraulic type. Hydraulic transmissions of the hydrostatic type have application in many areas, particularly in the mobile field as applied to vehicles such as self-propelled farm implements, trucks, tractors, and the like. These transmissions usually comprise a power unit coupled to drive a variable-displacement hydraulic pump with a hydraulic motor or motors being supplied pressure fluid by the pump. Means are operatively connected to the pump and motor for controlling and coordinating changes in displacement so as to provide varying output speeds and torques. Typical of the system is the hydrostatic transmission described in U.S. Pat. No. 3,238,724.

For any vehicle extremely fast accelerations and decelerations are harmful and dangerous. High rates of deceleration on a self-propelled agricultural combine, for example, are particularly dangerous because of the light load on the rear wheels which are the steering wheels. A fairly fast deceleration can easily lift the rear wheels off the ground causing the loss of steering and control of the vehicle.

The problems of fast acceleration and deceleration of hydraulic variable-speed transmissions have been dealt with in several ways. For example, one novel solution to this problem in a system utilizing a hydrostatic drive is found in copending application Ser. No. 677,194 filed Oct. 23, 1967, now U.S. Pat. No. 3,463,034; wherein through a gear ratio change, different size orifices are inserted into the path of fluid flow of the displacement control, thus limiting the rate of speed change.

It is also known to incorporate an acceleration control for a hydrostatic drive that is responsive to a surge of control pressure to divert the flow from the pump swash plate control cylinder. Similarly, torque in terms of pressure, is used to control a displacement control servo.

However, these and other prior art systems are generally quite complex, including cumbersome mechanical linkage. The prior art devices are, by in large, speed-limiting devices rather than acceleration-limiting devices. The system that operates to limit acceleration usually senses motor speed rather than acceleration of the driven vehicle.

Accordingly, it would be advantageous to provide an effective, simplified automatic control for limiting acceleration of hydraulic transmissions.

It is therefore the principal object of this invention to provide a new and improved acceleration and deceleration control for variable-speed hydrostatic drives that is automatically responsive to the actual magnitude of vehicle acceleration.

Another object of this invention is to provide an automatic acceleration control which varies the flow rate to the swash plate servo of a hydrostatic transmission.

Another object of the invention is to provide an infinitely variable restriction valve which is positioned in the flow path of the swash plate servo of a hydrostatic transmission and is responsive to an acceleration sensor.

Another specific object of the present invention is to provide an automatic acceleration rate control for a self-propelled vehicle that has a compounded gear and hydrostatic transmission in its drive train.

A broad object of the invention is to provide an acceleration control that gives the vehicle a safe rate of acceleration and deceleration. Other objects and advantages of the invention will become apparent to those skilled in the art from the following detailed description of the invention taken in conjunction with the drawings in which.

Briefly, in accordance with the present invention, a hyrdostatic variable-speed transmission driving a vehicle such as a self-propelled combine, is equipped with a hydraulically operated displacement control the rate of operation of which is dependent upon the rate of flow thereto. A flow-restricting valve operably connnected to an inertia-sensing element is placed in the fluid supply conduit to the displacement control. Acceleration of the combine will be sensed by the inertia device which, in turn, moves the flow-restricting valve to a flow-restricting position. The restricted flow through the conduit limits the speed at which the displacement control can operate, thus limiting the rate of change of velocity of the drive unit. Generally the term "acceleration" as used throughout the specification and claims means a change of velocity, whether it be positive or negative.

FIG. 1

Figure 1:
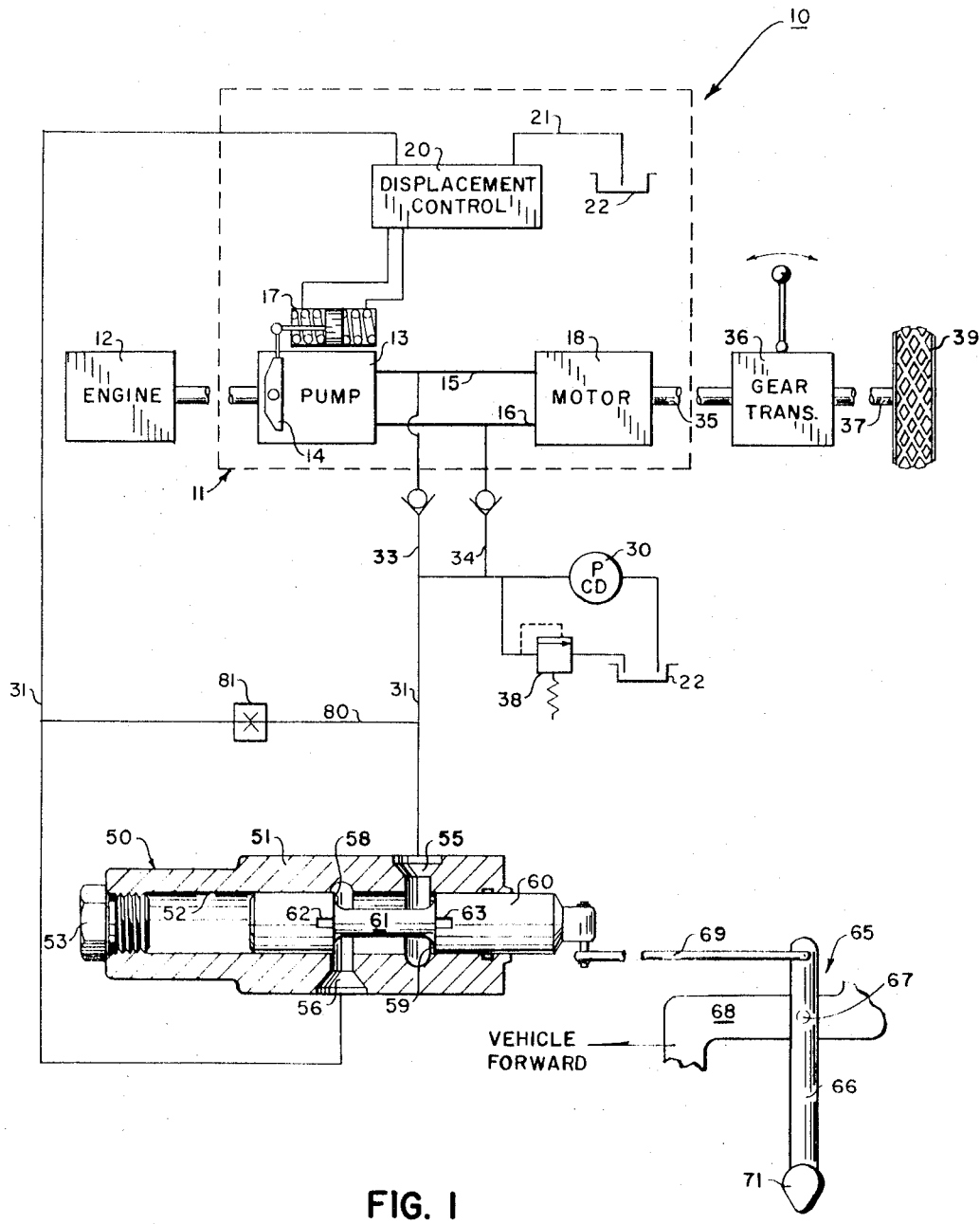
FIG. 1 shows an axial section through the preferred form of the acceleration control valve in conjunction with the inertia sensor shown with a schematic of a hydraulic system including a hydrostatic drive.

Turning now to the drawings, in which the same reference numerals indicate corresponding elements throughout the several views, reference is first made to FIG. 1, which illustrates, partially in schematic, a variable speed drive system generally identified by reference numeral 10. The system includes hydrostatic drive 11 encompassed within the dotted rectangle. The drive system includes an engine 12 coupled to the drive shaft of a variable displacement piston pump 13 with cam means adjustable to vary the output displacement shown as tiltable swash plate 14. In hydraulic communication with the pump 13 through discharge conduit 15 and return conduit 16, and driven thereby is hydraulic motor 18. The motor 18 may be of the variable-displacement type having a displacement-varying swash plate or may be a constant-displacement hydraulic motor as is shown for simplicity. Hydraulically actuated servo unit 17, shown as a double-acting linear actuator, has its piston mechanically linked to swash plate 14 of the pump. The displacement control 20 serves to deliver fluid to servo 17 to position swash plate 14. Displacement control 20 may be a conventional spool-type three-way valve or, as in the case of a system having both a variable displacement pump and motor, a sequential control such as is shown in U.S. Pat. No. 3,238,724. Since the particular type of displacement control forms no part of my invention, any type of fluid control that serves to position the servo cylinder and respective swash plate to vary displacement will be suitable.

The hydraulic circuit for the displacement control includes a conduit 21 that connects the control to a reservoir 22. Fluid pressure for operation of the servo is supplied from a low-pressure constant-volume pump 30 through line 31. Lines 33 and 34 connect the pump 30, through check valves, to the conduits 15 and 16 between the pump 13 and motor 18 and serve to charge the system by supplying fluid to the low-pressure side of the drive. Either of lines 15 or 16 may be the low-pressure side, depending on which is serving as pump discharge. Relief valve 38 serves to protect pump 30 from overpressurization.

The output shaft 35 of the motor 18 of the hydrostatic drive is connected to a mechanical gear unit 36 to complete the transmission. Output shaft 37 of the gear unit is connected, either directly or through a differential, to a drive wheel 39 of the vehicle.

An acceleration rate, flow-restricting valve 50 is interposed in conduit 31 and controls the flow and hence the rate of speed of operation of servo 17. The valve 50 has body 51 provided with axial bore 52. Inlet and outlet passages 55 and 56 intersect the bore 52. Valve spool 60 is operably connected with an inertia-sensing device 65 which positions the valve spool within the body and controls the flow therethrough. Valve spool 60 provided with a reduced diametral section 61 defined by lands 58 and 59 and variable metering notches 62 and 63. As shown in FIG. 1, when the spool is in a neutral position, flow through the valve 50 from line 31 is unrestricted. As the spool is moved to the left, the flow path becomes more restricted as land 63 moves to partially close off inlet 55 allowing flow only through notch 63 and finally fully restricting flow. Similarly, as the valve spool 60 is moved rightwardly, flow becomes restricted until it is completely blocked off.

The inertia-sensing device 65 which is operatively connected to the spool 60 of valve 50 and controls the degree of restriction through valve 50, includes pendulum arm 66 having mass 71 affixed to its lower end. Arm 66 is pivotally attached at a fixed point, as by rivet 67, to bracket 68 which is mounted on the moving vehicle. Mechanical linkage 69 connects the upper end of arm 66 to valve spool 60. As the pendulum oscillates about its axis at 67 responsive to the forces of acceleration, the spool is moved to a proper flow-restricting position.

A bypass conduit 80 including a fixed flow restrictor 81 may be included in the control system. The bypass allows a minimum rate of flow through conduit 31 around the valve 50 to the displacement control even at very high acceleration or deceleration rates when spool 60 completely blocks off flow through the valve, stabilizing the operation of the rate control valve 50 and the operation of the driven vehicle.

Adjustability of the neutral position of spool 60 with the valve 50 may be desirable. For example, it will be noted that the neutral position of spool 60 can be changed by varying the length of linkage 69 with reference to inlet 55 and outlet 56 so that flow through conduit 31 is restricted by notch 62 more quickly upon deceleration, than it is restricted by notch 63 when the combine accelerates. Vehicle deceleration will be more limited to provide safer operation than acceleration is limited to provide greater maneuverability.

OPERATION

Operation of the above-described system will be explained for purpose of illustration, with the transmission being considered as driving an agricultural combine.

Initially the hydrostatic transmission 11 is neutrally positioned as shown with pump swash plate 14 in zero displacement position and the output shaft 35 of the motor not rotating. The operator selects the gear range desired and, for example, shifts gear box 36 into low gear. A manual signal is given to displacement control 20 which allows pressure fluid from pump 30 to flow through line 31, valve 50, displacement control 20, and into the right end of servo 17, the left end of servo 17 being vented through line 21 to reservoir 22 through the displacement control.

Fluid pressure in servo 17 causes swash plate 14 to tilt in a counterclockwise direction and pump 13 begins to discharge through conduit 16 until full flow conditions are reached as swash plate 14 assumes its maximum angular position. In a system having a variable displacement motor, as shown in U.S. Pat. No. 3,238,724, additional motor speed could be obtained by sequentially tilting the swash plate to decrease the motor displacement.

In response, the vehicle will accelerate to its maximum speed in first gear which for a combine in the present example is about 4 m.p.h. in 4 seconds. For purposes of illustration, the maximum speed in second gear in 12 m.p.h. and third gear 20 m.p.h. If the operator desires a higher speed range, he places gear box 36 in a higher ratio, say third gear. In the absence of any acceleration control the same interval of time (4 seconds) is required for full acceleration in all gear ranges. Obviously, 4 seconds is too fast an elapsed time for an acceleration to 20 m.p.h., and in such instance, the present novel acceleration control operates to maintain acceleration rates within safe limitations.

As the pump swash plate tilts and increases flow to the motor, increasing the speed of output shaft, the vehicle begins to accelerate rapidly in third gear.

The forward acceleration causes pendulum arm 66 to rotate counterclockwise about pivot 67. This rotation is transmitted through linkage 69 to valve spool 60, causing the spool to move to the left restricting the flow through valve 50.

It will be obvious that a high rate of acceleration will move valve spool 60 to the left until the flow path between valve inlet 55 and outlet 56 is completely restricted. In this case, some predetermined minimum flow may pass to the displacement control through bypass conduit 80 to line 31. The restricted flow rate through line 31 to the displacement control causes a corresponding reduction in the velocity of the swash plate which, in turn, retards and limits the change in motor speed. As acceleration reduces the and vehicle speed becomes more constant, the linear acceleration forces applied to the inertial member 65 are reduced and pendulum arm 66 returns to a vertical or near vertical position, no longer restricting flow through conduit 31.

Similarly, it will be seen that decelerating the vehicle when moving forward will cause clockwise rotation of the pendulum and rightward movement of valve spool and corresponding restriction of flow. The amount of rotation of arm 66 of inertial member 65 and the distance of movement of valve spool 60 is thus proportional to the acceleration or deceleration experienced by the vehicle. The force of gravity restores and maintains the pendulum to a vertical position in the absence of acceleration forces.

It is not essential to the acceleration control system herein described that the flow-restricting valve be placed in the conduit which connects pump 30 to the displacement control 20 and servomechanism 17. Alternatively the restricting valve 50 may be placed in any flow path through which fluid is forced to flow when the servo is actuated, including drain line 21 which conducts discharged fluid to the reservoir 22.

FIG. 2 EMBODIMENT

Figure 2:
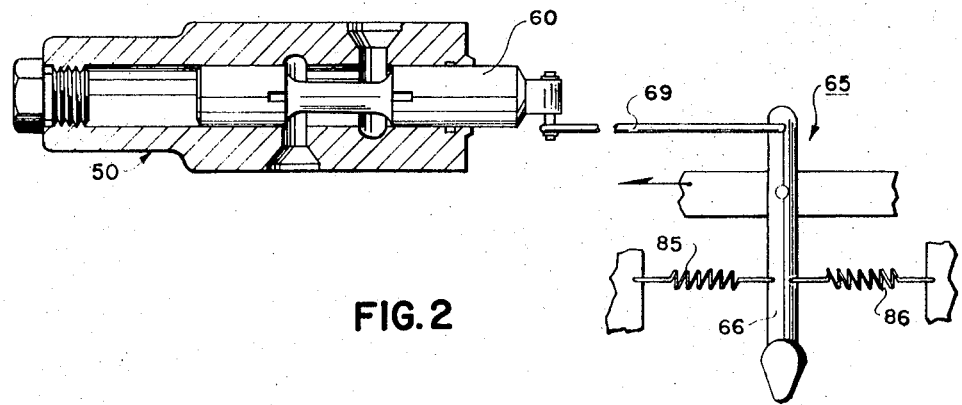
FIG. 2 shows an alternate form of the inertia device provided with positive centering and damping means.

FIG. 2 shows a modified form of the inertia device provided with positive spring centering to assist in restoring the pendulum to its center position. The inertia sensing device 65 is as described with reference to FIG. 1, having a pivotally mounted pendulum arm 66 acting through linkage 69 to position valve spool 60. Springs 85 and 86 extend oppositely from pendulum 66 to fixed points and act to restore pendulum 66 to the center position and also function as a dash pot to dampen oscillation and vibration of the inertia member 65. The spring load applied through springs 85 and 86 can be adjusted to determine how fast the vehicle is allowed to accelerate or decelerate unencumbered before valve 50 begins retarding the rate of fluid flow.

FIG. 3 EMBODIMENT

Figure 3:
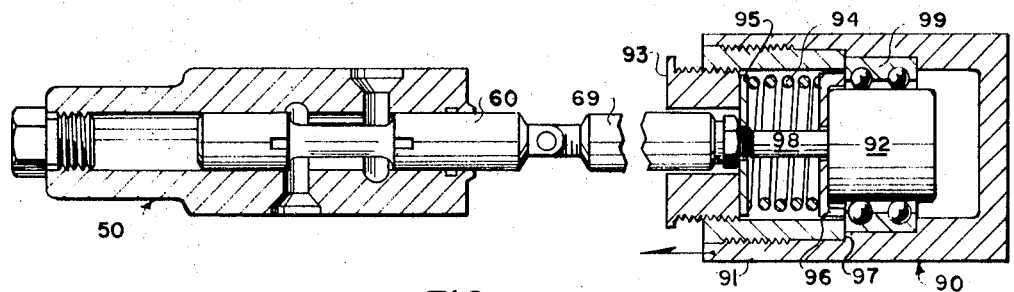
FIG. 3 illustrates still another form of the inertia sensing member.

FIG. 3 depicts the force sensor as a laterally moving inertia member 90 that automatically positions valve spool 60 to restrict flow and prevent too great acceleration. The inertia member 90 includes a casing 91 which is secured to the combine or vehicle. Mass 92 is connected to valve spool 60 through linkage 69 and connecting rod 98 which extends through casing end wall 93. Mass 92, in the absence of acceleration force, is centered within casing 91 in bearings 99. Spring 94 is interposed within casing 91 between end wall 93 and mass 92. End plates 95 and 96 are movable within the casing and slidable about the connecting rod and are located between the spring 94 and the end wall 93 and mass 92, respectively.

Upon application of acceleration force, mass 92 moves laterally within its casing to position valve spool 60. For example, during forward acceleration, mass 92 moves to the right on bearings 99. It will be noted that, in this case, end plate 96 remains stationarily abutted against lip 97 within the casing and end plate 95 is pulled to the right by mass 92, thus compressing spring 94. When the acceleration force dissipates, the spring extends causing mass 92 to return to its central position. It will be obvious that upon deceleration, member 90 operates in a similar manner with the mass 92 compressing spring 94 leftwardly through plate 96.

FIG. 4 EMBODIMENT

Figure 4:
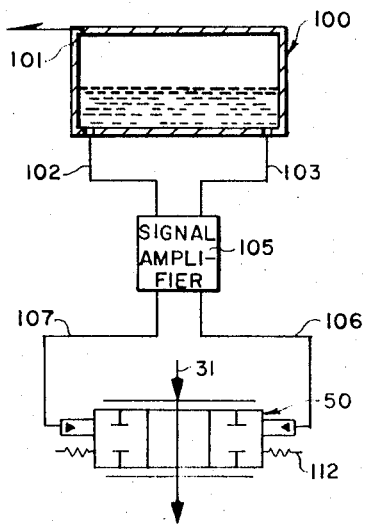
FIG. 4 is a view, partially in section and partially schematic, showing an acceleration control responsive to hydrostatic pressure.

In FIG. 4, the acceleration force sensor 100 generates a hydrostatic pressure differential in proportion to the rate of vehicle acceleration. Instead of a mechanical inertia member, a fluid container 101 is affixed to the combine or vehicle. Forward movement with the vehicle is indicated by the direction of the arrow.

Located at opposite ends of fluid container 101 are conduits 102 and 103 which are in communication with liquid in the container and are connected to signal amplifier 105. When the vehicle is not accelerating, the liquid within container 101 is essentially level and the static pressures within conduits 102 and 103 are equal. When the vehicle accelerates forwardly, the forces of acceleration cause the body of liquid to shift with the liquid level being higher at the rear of container 101 than at the front. Conversely, when the combine decelerates, the liquid level shifts with the level being higher at the front of container 101. The difference in level is reflected as a pressure differential in conduits 102 and 103. For example, during acceleration the shift in liquid level results in a higher pressure in conduit 103 which is appropriately amplified by amplifier 105 and transmitted by conduits 106 and 107 to restrictor valve 50. Valve 50 is shown schematically for simplicity as an infinite position variable metering valve interposed in the flow path 31 of the servo. Centering springs 112 are included with valve 50 to return it to a neutral nonrestricting position when the body of fluid in container 101 is returned to a level state. As discussed with reference to FIG. 1, the extreme right and left positions of valve 50 completely block off flow through the flow path 31 going to the displacement control and servo.

FIGS. 5 & 6 EMBODIMENT

Figure 5:
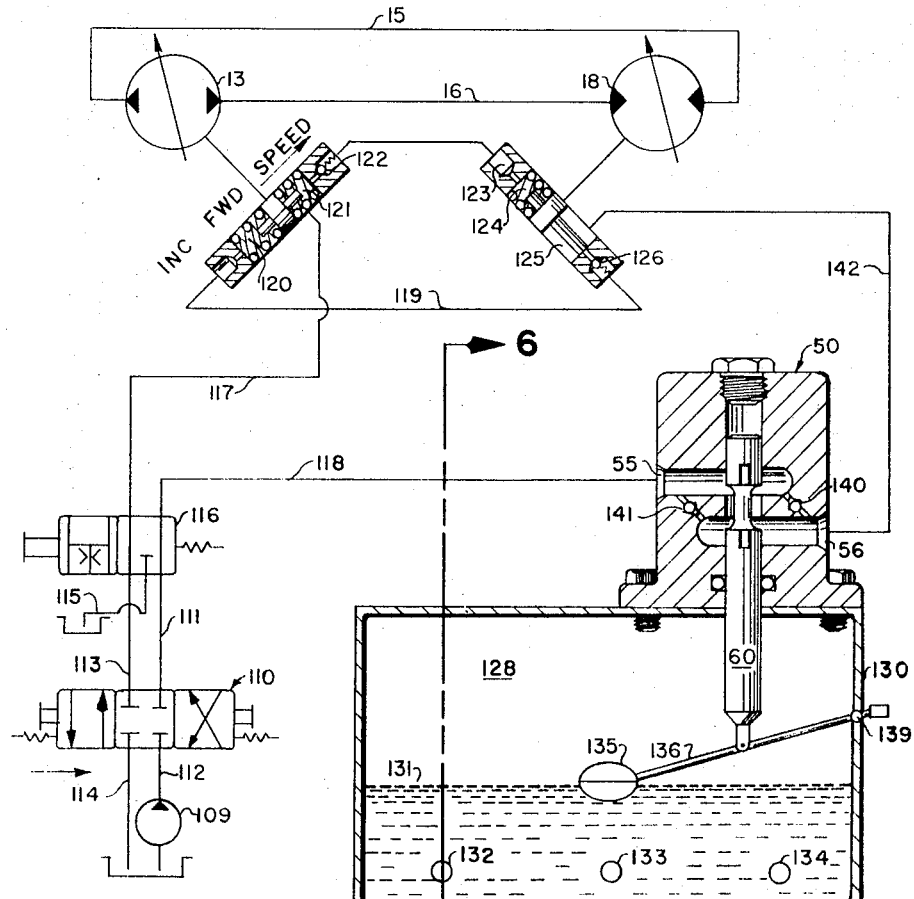
FIG. 5 is partially sectional and partially schematic view of a form of the acceleration control in combination with a hydrostatic drive having both a variable-volume pump and motor; and, FIG. 6 shows a section of reduced scale taken along lines 6-—6 of FIG. 5.
Figure 6:
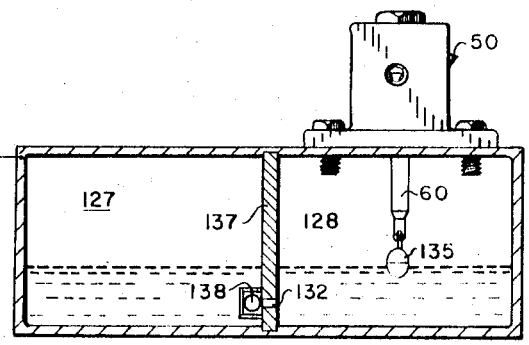

FIGS. 5 and 6 illustrate an additional form of the invention in conjunction with a hydrostatic transmission having a variable speed pump 13 and variable speed motor 18. The sequential control for the pump and motor, which form no part of the invention, may be as described in U. S. Pat. No. 3,238,724. However, for clarity of understanding, a brief description of the operation of this type of sequential control is herein set forth in connection with the present embodiment.

The acceleration sensor and control includes a fluid container 130 rigidly attached to the vehicle with the forward direction of travel of the vehicle being shown by the arrow in FIG. 6. Control valve 50 is secured to the top of the container and has slidable spool 60 which is attached to link 136. Link 136 is pivotally connected to container 130 at pin 139, the other end being secured to float 135. It is obvious that variations in liquid level 131 will be reflected in the vertical position of spool 60. A baffle or partition 137 can be included within container 130 to form several chambers 127 and 128. These chambers act to dampen the fluid movement as the vehicle is in motion. Holes 132, 133 and 134 near the bottom of baffle 137 provide for fluid flow between the chambers in container 130. As seen in FIG. 6, fluid will flow from chamber 128 through holes 132, 133 and 134 into chamber 127 as the combine or vehicle decelerates, causing float 135 to descend and spool 60 to meter flow by restricting flow in the supply line 142 in the manner described above. Similarly, fluid flows from chamber 127 to chamber 128 when the combine accelerates, so that the float 135 and valve spool 60 move upwardly to restrict flow through line 142.

To provide faster response of spool 130 when the combine decelerates than when the combine accelerates, one-way check valves 138 are provided in connection with some of passages 132, 133 and 134. The check valve construction allows a greater flow rate from chamber 128 to 127 with a faster drop in the float and corresponding faster restrictive flow rate. This modification providing faster response to deceleration insures better control and reduces the possibility of the rear steering wheels lifting off the ground, while still allowing faster acceleration for maneuverability.

Valve 50 and spool 60 cooperate to control flow as mentioned above and are further provided with bypass passages 140 and 141 which connect the inlet and outlet 55 and 56 through one-way check valves provided therein.

The size of bypass passage 140 determines the minimum rate of flow through conduit 142 to the pump and motor displacement controls, thus determining the slowest rate of acceleration. Similarly, the size passage 141 determines the minimum rate of flow from servo through conduit 118 to determine the slowest rate of deceleration. Passage 140 may be of greater cross-sectional area than 141 so that, for example, the slowest rate of acceleration is more rapid than the slowest rate of deceleration.

For forward propulsion the acceleration spool 110 is moved to the right to connect passage 111 with control pressure in conduit 112 and to connect passage 113 to drain conduit 114. Control pressure from pump 109 passes through conduit 118 and acceleration rate valve 50 on its way into motor servo chamber 125. The pressure unseats poppet 126, if not already mechanically unseated, allowing flow through conduit 119 into pump servo chamber 120 so that the pump displacement is increased to increase forward speed. Fluid displaced from pump servo chamber 121 passes to conduit 117, passage 113 and conduit 114 to drain. As maximum pump displacement is neared, poppet 122 is mechanically unseated, allowing fluid to drain from motor servo chamber 124. Control pressure in motor servo chamber 125 now causes the motor displacement to decrease and further increase forward speed. Throughout this operation the rates of change of displacements are governed by the rate of flow through acceleration rate valve 50.

For reverse propulsion (or forward deceleration), acceleration spool 110 is moved to the left to pressurize passage 113, conduit 114, and pump servo chamber 121, and simultaneously vent passage 111, conduit 118, and motor servo chamber 125. Pressure in chamber 121 assures that poppet 122 is opened to allow control pressure into motor servo chamber 124 and increase motor displacement. Fluid displaced from chamber 125 passes through acceleration rate valve in conduit 118 on its way to drain. When maximum motor displacement is neared, poppet 126 is mechanically unseated, allowing fluid in pump servo chamber 120 to drain through conduit 119, motor servo chamber 125, conduit 118, and through acceleration rate valve 50. Pressure in pump servo chamber 121 now decreases pump displacement to increase reverse speed; the fluid in chamber 120 being displaced through acceleration rate valve which determines rate of change of displacement.

When "float" spool 116 is moved to the right, conduits 117 and 118 are openly connected to permit free fluid flow between the pump and motor servos and to allow the servo springs to move the pump and motor swash plates to their neutral, zero displacement position. Again, the fluid flow in float position passes through the rate valve that determines vehicle acceleration. Both conduits 117 and 118 are restrictively connected with drain conduit 115 to relieve pressure from the pump and motor servo chamber.

Various other changes and modifications in the device herein chosen for purpose of illustration in the drawings will readily occur to persons having ordinary skill in the art. To the extent that such modifications and changes do not depart from the spirit of the invention; they are intended to be included in the scope hereof.

Having fully described the invention is such manner as to enable those skilled in the art to understand and practice same,

We claim:

1. A transmission system for use in a vehicle propulsion system comprising:
   a pump having cam means adjustable to vary the displacement;
   a fluid motor having cam means adjustable to vary the displacement and being coupled to drive the vehicle;
   conduit means operatively connecting the pump and motor in a continuous fluid circuit;
   first servo means operatively connected to the pump cam means, said first servo means being effective when energized to adjust the pump cam means;
   second servo means operatively connected to the motor cam means, said second servo means being effective when energized to adjust the motor cam means;
   a fluid pressure source communicating with the first and second servo means for supplying pressure fluid to energize the servo means;
   displacement-control means interposed between said fluid pressure source and said first and second servo means for selectively directing pressure fluid from the source to said first and second servos;
   variable-restriction means positioned in the flow path of said servo means controlling the rate of fluid flow therethrough and thereby controlling the speed of movement of the servo means and vehicle acceleration; and
   means mounted on the vehicle sensing vehicle acceleration and operably connected to position said variable restriction means whereby the rate of vehicle acceleration is automatically controlled within predetermined limits.

2. The transmission according to claim 1, wherein said pump and motor are of the axial piston type and said pump and motor cam means adjustable to vary the displacement comprise inclinable swash plates.

3. A transmission system for use in a vehicle propulsion system comprising:
   a variable-displacement pump having cam means adjustable to vary the displacement;
   a positive-displacement fluid motor being coupled to drive the vehicle;
   conduit means operatively connecting the pump and motor in a continuous fluid circuit;
   servo means operatively connected to the pump cam means, said servo means being effective when energized to vary the fluid pump cam means;
   a fluid pressure source communicating with the servo means for supplying fluid pressure to energize the servo means;
   valve means positioned in the flow path of the servo means, said valve means being variably positionable to regulate the flow therethrough and thereby regulate speed of movement of the servo means and vehicle acceleration; and
   means mounted on the vehicle sensing vehicle acceleration and being operably connected to position said valve means whereby the rate of vehicle acceleration is automatically controlled within predetermined limits.

4. The transmission according to claim 3, wherein said sensing means comprises a container having a liquid therein establishing a liquid level, said level varying with the force of acceleration, and means responsive to said liquid level variation to position said valve means.

5. The transmission according to claim 4, wherein said means responsive to said liquid level variation includes a signal amplifier responsive to pressure differential.

6. The transmission according to claim 4, wherein said means responsive to said liquid level variation includes a float in said liquid operably connected to said valve means.

7. A transmission system for use in a vehicle propulsion system comprising:
   a variable-displacement pump having an inclinable swash plate;
   a positive-displacement fluid motor having an output shaft;
   conduit means operatively connecting the pump and motor in a continuous fluid circuit;
   servo means operatively connected to the pump swash plate, said servo means being effective when energized to vary the inclination of the swash plate to vary the fluid output of the pump;
   a fluid pressure source communicating through a conduit with the servo means for supplying fluid pressure to energize the servo means;
   control valve means positioned in the flow conduits of the servo means, said control valve having a spool therein with a nonrestrictive position which permits flow therethrough and being bidirectionally slidable to progressively restrict flow until completely blocked;
   inertia means pivotally mounted to the vehicle to oscillate substantially in the direction of vehicle travel, said inertia means being connected to said valve spool to position said spool in said valve whereby the rate of change of speed of the transmission is automatically controlled within predetermined limits by regulation of the flow of fluid.

8. The transmission according to claim 7, wherein said inertial member is biased to return to a neutral position upon reduction of acceleration forces.

9. The transmission according to claim 7, wherein means are provided to insure a certain predetermined minimum flow to the servo when the valve spool is in a fully flow-restricting position.